United States Patent
Leong et al.

(10) Patent No.: US 6,772,172 B2
(45) Date of Patent: Aug. 3, 2004

(54) METHOD, SYSTEM, PROGRAM, AND COMPUTER READABLE MEDIUM FOR INDEXING OBJECT ORIENTED OBJECTS IN AN OBJECT ORIENTED DATABASE

(75) Inventors: Terence Leong, Benica, CA (US); Julian S. Taylor, Nederland, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 354 days.

(21) Appl. No.: 09/844,474

(22) Filed: Apr. 27, 2001

(65) Prior Publication Data

US 2002/0161781 A1 Oct. 31, 2002

(51) Int. Cl.$^7$ ............................................. G06F 17/30
(52) U.S. Cl. ......................................... 707/103; 707/3
(58) Field of Search ................................ 707/103, 100, 707/101, 102, 3, 4, 6

(56) References Cited

U.S. PATENT DOCUMENTS

| | | | | |
|---|---|---|---|---|
| 5,701,467 A | * | 12/1997 | Freeston | 707/100 |
| 5,960,194 A | * | 9/1999 | Choy et al. | 707/102 |
| 6,003,038 A | * | 12/1999 | Chen | 707/103 R |
| 6,061,678 A | * | 5/2000 | Klein et al. | 707/3 |
| 6,128,771 A | | 10/2000 | Tock et al. | 717/1 |
| 6,349,308 B1 | * | 2/2002 | Whang et al. | 707/103 Z |
| 6,374,256 B1 | * | 4/2002 | Ng et al. | 707/103 R |
| 6,457,017 B2 | * | 9/2002 | Watkins et al. | 707/103 R |
| 6,457,018 B1 | * | 9/2002 | Rubin | 707/4 |
| 6,539,388 B1 | * | 3/2003 | Hattori et al. | 707/101 |

FOREIGN PATENT DOCUMENTS

EP      1030253      8/2003

OTHER PUBLICATIONS

Comer, Douglas. "The Ubiquitous B–Tree". *Computing Surveys*, vol. 11, No. 2, Copyright 1979 ACM. Jun. 1979, 121–137.

Luk, Frank Hing–Wah and Ada Waichee Fu. "Triple–Node Hierarchies for Object–Oriented Database Indexing". Apr. 29, 1998. 1–35.

Ramaswamy, Sridhar and Paris C. Kanellakis. "OODB Indexing by Class–Division". Proceedings of the 1995 ACM SIGMOD international conference on Management of data. 1995. 1–23.

Chaudhuri, A.B. "Object–Oriented Databases and Mission–Critical Directories". Copyright 1998 NEXOR. Jun. 1998. 1–14.

Kim, Won. "Research Directions in Object–Oriented Database Systems". Copyright 1990 ACM. 1–15.

Smith, Karen E., and Stanley B. Zdonik. "Intermedia: A Case Study of the Differences Between Relational and Object–Oriented Database Systems". OOPSLA '87 Proceedings. Copyright 1987 ACM. Oct. 4–8, 1987. 452–465.

(List continued on next page.)

*Primary Examiner*—Sanjiv Shah
(74) *Attorney, Agent, or Firm*—Lahive & Cockfield, LLP

(57) ABSTRACT

Provided is a method, system, program, and data structures for indexing object oriented objects in an object oriented database. An object data structure is provided including a plurality of object oriented objects, wherein each object includes a key value, and wherein each object is associated with an object index. A node data structure is provided including nodes, wherein each node represents one object in the object store and includes one object index used to access the object represented by the node in the object store. The nodes in the node data structure are organized according to the key values in the objects represented by the nodes. The node data structure is used to access the objects in the object store.

73 Claims, 4 Drawing Sheets

OTHER PUBLICATIONS

"Class java.util.Vector", Java Platform API Specification, Version 1.1.8. Copyright 1995–1999 Sun Microsystems, Inc. [Retrieved on Apr. 5, 2001]. Retrieved from the Internet at <URL: http://java.sun.com/products/jdk/1.1/docs/api/java.util.Vector.html#_top_<.

"Class Vector", Java 2 Platform, Standard Edition. Copyright 1993–1999 Sun Microsystems, Inc. [Retrieved on Apr. 5, 2001]. Retrieved from the Internet at <URL:http://java.sun.com/products/jdk/1.2/docs/api/java/util/Vector.html>.

Patent Cooperation Treaty (PCT) International Search Report, mailed on Jul. 1, 2003, for International Application No. PCT/US02/12905.

PCT Written Opinion for International Application No. PCT/US02/12905, dated Jul. 9, 2003.

Viara, E., et al. "*The Eyedb Oodbms.*" Database Engineering and Applications, 1999. IDEAS '99. International Symposium Proceedings Montreal, Que., Canada 2–4 Aug. 1999, Los Alamitos, CA, USA, IEEE Comput. Soc. US, Aug. 2, 1999 (Aug. 8, 2002) pp. 399–402.

Travers, B., et al. "*Java System Database Server.*" Retrieved from the Internet:, <URL:http://www.opengroup.org/ncmg/members/archive/wdocs/JSDS101.pdf> Retrieved on Dec. 6, 2002, pp. i–viii, 9–64.

Arshad, K.M., et al. "*A Corba based Framework for Trusted E–Commerce Transactions.*" Enterprise Distributed Object Computing Conference, 1999. EDOC '99. Proceedings. Third International Mannheim, Germany 27–30 Sep. 1999, Piscataway, NJ, USA, IEEE, US, Sep. 27, 1999, pp. 18–25.

Chee Chin Low et al. "*H–trees: A Dynamic Associative Search Index for OODB.*" Proceedings of the ACM Sigmod International Conference on Management of Data. San Data, Jun. 2–5, 1992, New York, ACM, US, Jun 2, 1992 pp. 134–143.

\* cited by examiner

METHOD, SYSTEM, PROGRAM, AND COMPUTER READABLE MEDIUM FOR INDEXING OBJECT ORIENTED OBJECTS IN AN OBJECT ORIENTED DATABASE

BACKGROUND OF THE INVENTION

1. Field of the Invention

The present invention relates to a method, system, program, and computer readable medium for indexing object oriented objects in an object oriented database.

2. Description of the Related Art

An object oriented data base system (OODBMS) provides a persistent and sharable repository and manager of objects defined according to an object-oriented data model. Every object encapsulates a state and behavior. The state of an object comprises the values of the attributes (also referred to as properties) defined for the object, and the behavior of the object comprises the methods provided with the objects. Objects that share the same attributes and methods comprise a class. All the objects maintained in an OODBMS are members of the same class or have the same parent class. This means that the same set of methods defined for the class are used to manipulate the objects in the OODBMS, such as create, delete, add, read, modify, update, etc. Further the objects in a class have the same attributes defined for the class, even though particular attributes within any of the objects in the class may have different values. Objects persistently stored within an OODBMS defined for a class are viewed and distinguished according to the values provided for their attributes. Each object is further provided a unique identifier for use in accessing the object within the OODBMS using the interfaces provided for the class. Benefits and further explanations of object oriented databases are described in "Research Directions in Objected-Oriented Database Systems", by Won Kim (Copyright Association of Computing Machinery, 1990); "Intermedia: A Case Study of the Differences Between Relational and Object-Oriented Database Systems", by Karen E. Smith, Stanley B. Zdonik, OOPSLA '87 Proceedings (Copyright Association of Computing Machinery, 1987), and U.S. Pat. No. 6,128,771, all of which publications and patents are incorporated herein by reference in their entirety.

Currently, many object oriented database systems are implemented using a Java application programming interface (API).** The application programmer may write APIs in Java to use to access the object oriented database management system (OODBMS). The interfaces to the objects in the OODBMS are also written in Java, and the objects in the OODBMS are implemented as Java classes. In such Java implemented OODBMSs, Java applications can generate Java objects to add to the Java OODBMS and utilize Java APIs to manipulate the Java objects in the Java OODBMS.

In the current OODBMS art, the Java objects being added to the database must be designed to implement the interfaces of the object oriented database class to allow database operations to be performed on the object, such as adding, searching, updating, deleting, etc. Thus, if a developer wants to add already developed objects to an OODBMS, the developer must modify and extend the preexisting objects to implement the object oriented database class. This process to extend pre-existing objects can be cumbersome and time consuming. The need to extend pre-existing objects to implement the object oriented database interface has hindered the widespread use of object oriented database management systems to store and index pre-existing object stores that do not implement the object oriented database class.

Thus, there is a need in the art to provide an improved object oriented database system.

SUMMARY OF THE DESCRIBED IMPLEMENTATIONS

Provided is a method, system, program, and data structures for indexing object oriented objects in an object oriented database. An object data structure is provided including a plurality of object oriented objects, wherein each object includes a key value, and wherein each object is associated with an object index. A node data structure is provided including nodes, wherein each node represents one object in the object store and includes one object index used to access the object represented by the node in the object store. The nodes in the node data structure are organized according to the key values in the objects represented by the nodes. The node data structure is used to access the objects in the object store.

In further implementations, each node is associated with one node index used to access the node in the node data structure and each node is further capable of including one or more node indexes to further nodes. A search key is received. One node is accessed using the node index for the node. The object index in the accessed node is used to access the object in the object store and the key value in the accessed object is accessed. An operation is performed if the accessed key value matches the search key. If the accessed key value does not match the search key and if the accessed node includes a node index to another node, then the node index is used to access the further node and another iteration is performed of the steps of using the object index in the further node to access one object in the object store, accessing the key value in the accessed object, and performing the operation if the accessed key value matches the search key.

Still further, the nodes may form a tree structure, wherein the further node accessed using the node index in one node comprises a child node of the node including the node index.

Yet further, the object data structure and node data structure may comprise an array data structure, wherein the object and node indexes are used to access the associated object and node, respectively, in the array. The array data structure may comprise a one dimensional array that can expand or contract automatically to accommodate adding and removing elements therefrom, such as Java vector.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
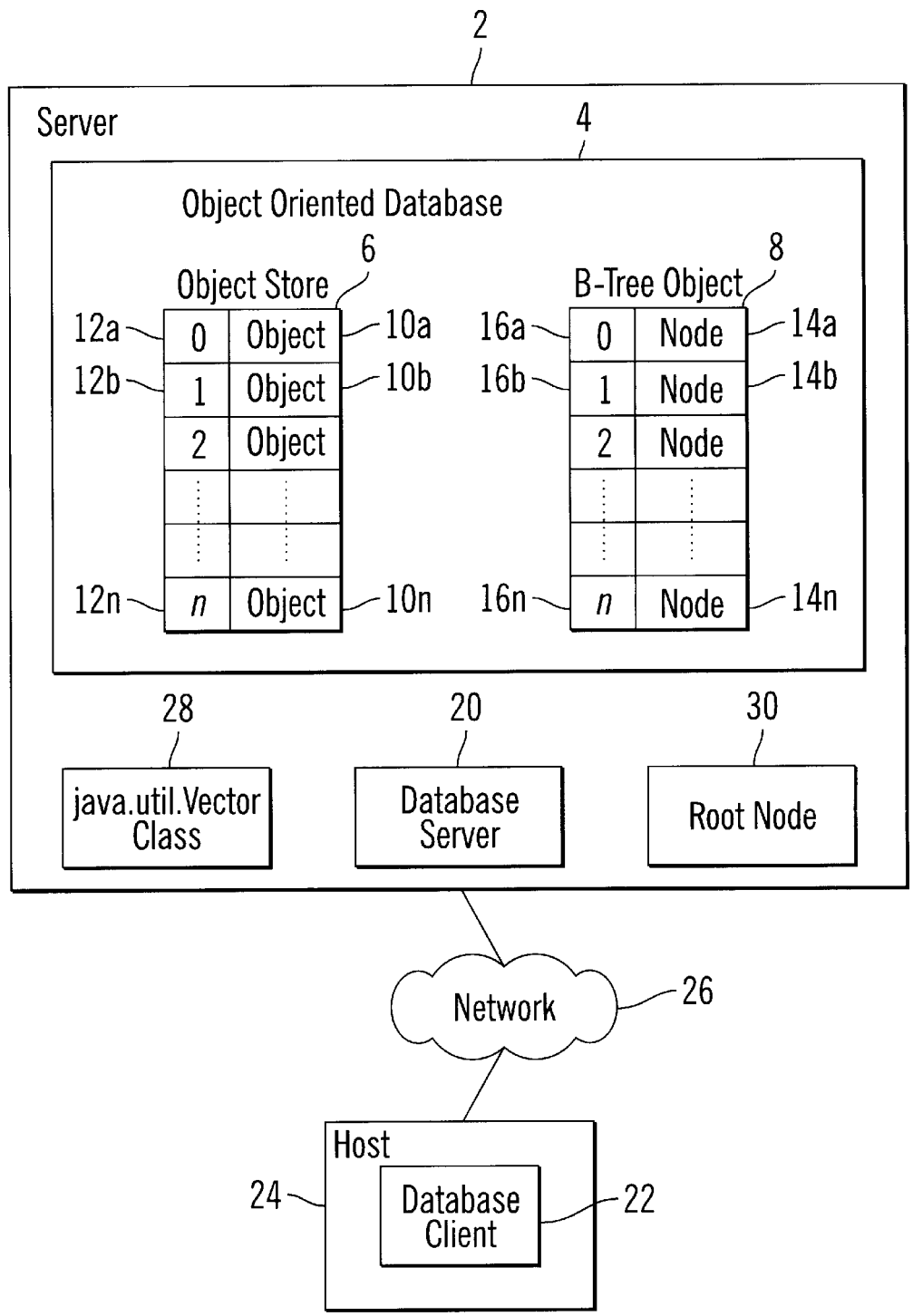
FIG. 1 illustrates an object oriented database computing environment including certain implementations of the invention.

FIG. 1 illustrates an object oriented database environment in which aspects of the invention are implemented. A server 2 includes an object oriented database 4 that comprises an object store 6 and a balanced tree, "B-Tree", object 8. The object store 6 includes a plurality of objects 10a, b . . . n where each object comprises an object oriented object that is an instance of a class. Each object 10a, b . . . n in the object store 6 has an associated index value 12a, b . . . n that is used to access the object 10a, b . . . n in the store. In certain implementations, the object store 6 may be implemented as a Java vector, using the interfaces of the Java vector utility class. In such case, the objects 10a, b . . . n in the Java vector are accessed using the index value 12a, b . . . n of the object. In Java vector implementations, the index value 12a, b . . . n provides a unique identifier or handle for the object 10a, b . . . n in the object store 6. A Java vector comprises an array that may automatically increase or decrease in size as necessary without requiring additional code or configuration.

The OODB database 4 further includes an implementation of the B-Tree object 8, where each node 14a, b . . . n of the B-Tree object 8 represents one of the objects 10a, b . . . n in the object store 6. Each B-Tree node 14a, b . . . n has a corresponding index value 16a, b . . . n that comprises a unique identifier of the node 14a, b . . . n in the B-Tree object 8 that is used to access the node 14a, b . . . n in the B-Tree object 8. The B-Tree object 8 may be implemented as a Java vector using the Java vector utility class.

A database server program 20 comprises the program that manages the database objects 4, 6, 8, 10, and 12 and executes operations against the database 4, such as adding, updating, and deleting objects in the object store 6 and executing queries against the object store 6 using the object store 6 index derived from the B-tree object 8. In implementations where the database objects 6 and 8 comprise Java vectors, the database server 20 would utilize interfaces in the Java vector utility class 28 to instantiate the object store 6 and B-Tree object 8 and manipulate the elements therein. The database server program 20 thus includes the program components that perform the database management and access operations.

A database client program 22 is capable of interfacing with a user of the database and communicating database operation requests, such as adding, updating, and deleting records, to the database server 20 to execute against the database objects 6 and 8. FIG. 1 shows that the database client 22 is implemented in a host system 24 that communicates with the OODB server 2 over a network 26. The database client 22 may also be implemented in the server 2.

The server 2 may comprise any type of computing device known in the art capable of implementing a database, including a server system, workstation, personal computer, hand held computer, network appliance, telephony device, etc. Further, the object oriented database 4 may be distributed across multiple computer systems. A host system 24, which may comprise any computing device known in the art, e.g., a server, workstation, mainframe, telephony device, personal computer, portable computer, hand held computer, etc., is capable of communicating with the server 2 over the network 26.

Figure 2:
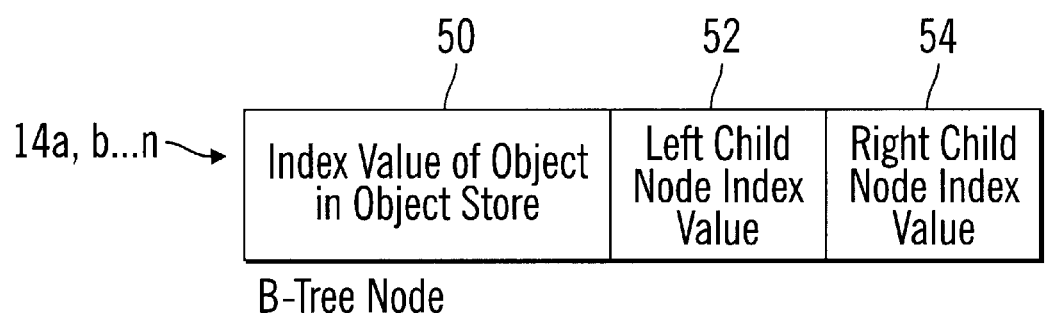
FIG. 2 illustrates a node entry in accordance with certain described implementations of the invention.

FIG. 2 illustrates an implementation of a data structure of the nodes 14a, b . . . n in the B-Tree object 8. Each node 14a, b . . . n in the B-tree object 8 represents a node in a balanced tree data structure known in the art. Each node 14a, b . . . n includes a field 50 having the index value 12a, b . . . n of the object 10a, b . . . n in the object store 6 that the node 14a, b . . . n represents in the B-Tree object 8. A left child node index 52 provides the index value of the left child node in the B-Tree object 8 used to access the left child node and a right child node index 54 comprises the index value 16a, b . . . n used to access the right child node 14a, b . . . n in the B-tree object 8. In this way, the nodes 14a, b . . . n in the B-tree object 8 represent the objects 10a, b . . . n in the object store 6 in a balanced tree or B-Tree data structure that is organized according to one or more key values in the objects 10a, b . . . n.

A root node index value comprises the index value of the root node in the B-Tree implemented in the B-tree object 8. In FIG. 1, the root node index value 30 is stored as an object in a separate location accessible to the database server 20. To traverse the B-Tree implemented in the B-Tree object 8, at each node 14a, b . . . n, the branch taken, e.g., right or left branch, depends upon the outcome of a comparison of the query key, i.e., the key being searched on, and the key for the object 10a, b, . . . n represented by the node. If the query key is less than the key in the object 10a, b . . . n in the node, then the left branch is taken, if greater, the right branch is taken. The publication the "Ubiquitous B-Tree", by Douglas Comer, ACM Computing Surveys, Vol. 11, No. 2 (June, 1972), which publication is incorporated herein by reference in its entirety, provides further details of a B-Tree index used for file organization.

In the described implementations, the objects 10a, b . . . n in the object store 6 include a field that has the key value for that object 10a, b . . . n. The database server 20 may issue a Java GET method identifying an object and field to obtain the value for a particular field in the object 10a, b . . . n. In certain implementations, the key value may be maintained in a field within an object embedded in the object 10a, b . . . n. In such case, the database server 20 would issue the GET method to the embedded object including the field that comprises the key value, and the embedded object would in turn issue the GET method against the embedded object including the key value field.

Figure 3:
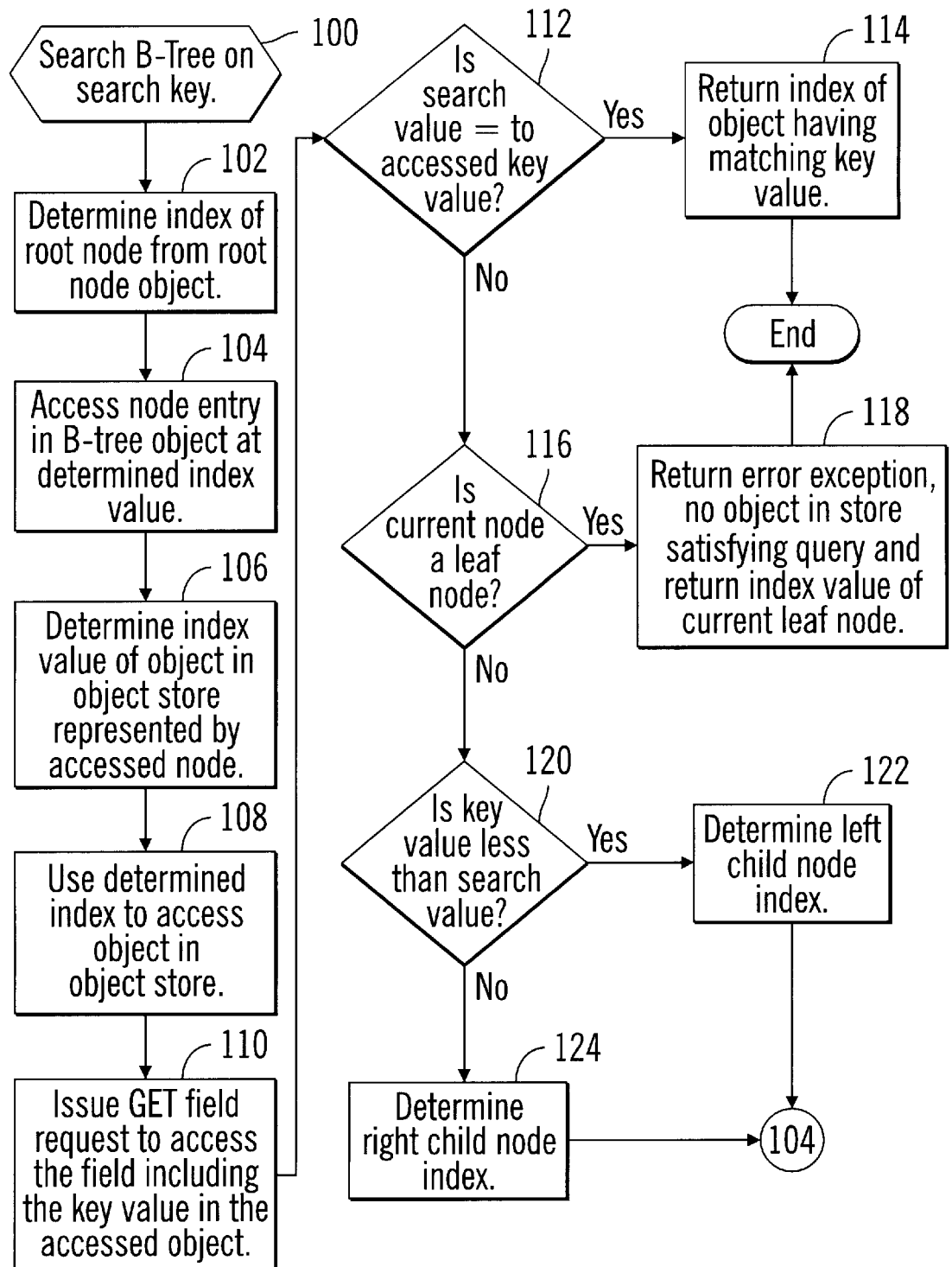
FIG. 3 illustrates logic to search an index for an object in accordance with certain described implementations of the invention.

FIG. 3 illustrates logic implemented in the database server 20 to execute a search operation to find a node 14a, b . . . n in the B-tree object 8 representing an object 10a, b . . . n in the object store 6 having a key value matching a query value. Control begins at block 100 upon receiving the search value and a call to the find operation. In response, the database server 20 determines (at block 102) the root node index from the root node data 30 maintained in a separate file. The database server 20 then accesses (at block 104) the node entry 14a, b . . . n in the B-Tree object 8 at the determined node index 16a, b . . . n. For instance, in Java vector implementations, the database server 20 can use the elementAt(int) method of the Java utility vector class 28 to access the node 14a, b . . . n at the index number 16a, b . . . n passed as the parameter to the elementAt( ) function. The database server 20 then determines (at block 106) the index value 12a, b . . . n of the object 10a, b . . . n represented by the accessed node entry 14a, b . . . n from the object index value field 50 in the accessed node entry 14a, b . . . n.

The object index 12a, b . . . n in the object index value field 50 is then used (at block 108) to access the object 10a, b . . . n represented by the accessed node 14a, b . . . n. In Java vector implementations, the elementAt( ) function may be used to access the object 10a, b, . . . n in the object store 6 using the determined index value 12a, b . . . n. In Java implementations, a Java GET field request is issued (at block 110) to access the key value in the accessed object 10a, b . . . n. As discussed, if the key value is located within an object embedded in the object 10a, b . . . n, then the object 10a, b . . . n issues the GET request against the embedded object including the field that includes the key value.

If (at block 112) the search value is equal to the returned key value in the accessed object 10a, b . . . n, then the database server 20 returns (at block 114) the index value 12a, b . . . n of the object 10a, b . . . n having the matching key value. Otherwise, if (at block 112) the accessed key value does not match the search value, then the database server 20 determines (at block 116) whether the node 14a, b . . . n accessed at block 104 is a leaf node. A leaf node may be indicated by setting the left 52 and right 54 node index values to NULL. If the current accessed node 14a, b . . . n is a leaf node, then the database server 20 returns (at block 118) an error exception indicating that no object 10a, b . . . n includes a key value matching the query value. If the current node is not a leaf node, i.e., there are child nodes, and the determined key value is less (at block 120) than the search value, then the database server 20 determines (at block 122) the left child node index value 16a, b . . . n in the field 52 of the accessed node 14a, b . . . n. Otherwise, if the key value is greater (at block 120) than the query value, then the right child node index value 16a, b . . . n is determined from field 54 in the accessed node 14a, b . . . n. From block 122 or 124, control proceeds back to block 104 to access the node 14a, b . . . n at the determined index value 16a, b . . . n. Also, if there is only one child node, and the determination at blocks 122 and 124 identifies a NULL value for the left or right child node index value, respectively, then control proceeds to block 118 to return an error.

When reaching a leaf node when adding a new node object to the B-Tree object 8, the implementation can invoke the addElement( ) method in the java.util.Vector class 28 to add a new node object to the B-Tree object 8 representing the B-tree structure. The new node object would be initialized by setting the index value field 50 to a new index value, determined by incrementing the last index value 12a . . . n in the object store 68, and setting the left child node Index 52 and right child node index 54 fields to NULL.

With the above implementations, a balanced or B-tree data structure may be used to index and search the object store 6 for an object 10a, b . . . n having a key value matching a search query without requiring the use of special OODB interfaces. Instead, standard interfaces from the Java vector utility class may be used to access the objects 10a, b . . . n in the object store 6 using a B-Tree index of the object store 6 elements implemented in the B-Tree object 8. Thus, adding, deleting, and updating entries in the object oriented database 4 does not require that the objects 10a, b . . . n implement interfaces of a special database class or be extended to accommodate special OODB database classes. In the above described implementations, all that is needed to determine the key value of the object 10a, b . . . n is knowledge of the object field that contains the key value. Additionally, the B-Tree object 8 may implement a multi-key B-tree index, in which case the database server 20 would have to use Java GET methods to access multiple key values from the object 10a, b . . . n.

Figure 4:
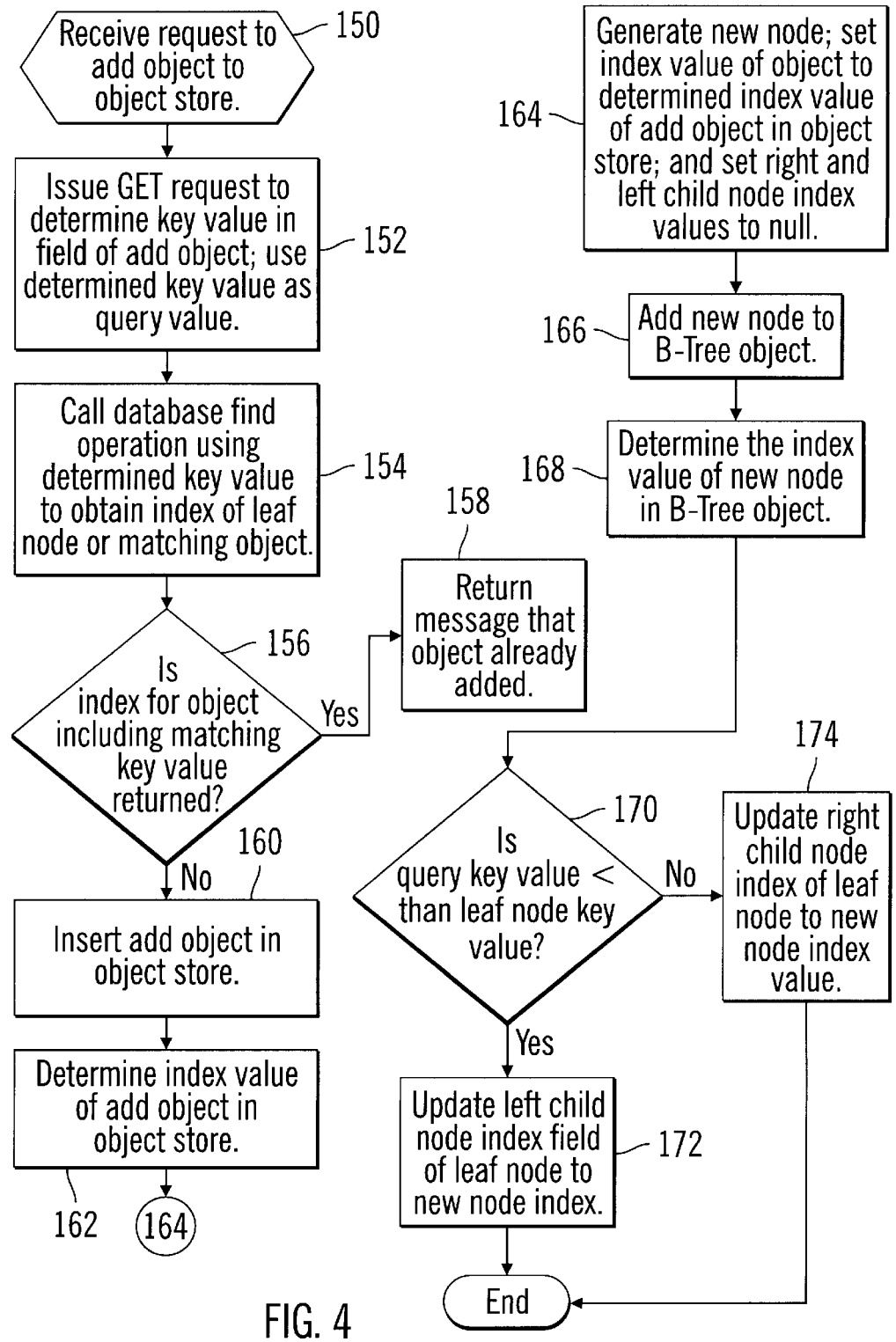
FIG. 4 illustrates logic to add an object to the object oriented database in accordance with certain described implementations of the invention.

FIG. 4 illustrates logic implemented in the database server 20 to insert an object into the object store 6 and provide a node in the B-tree object 8 for the added object. Control begins at block 150 with the database server 20 receiving a database insert command to add an object to the object store 6. In response, the database server 20 issues (at block 152) a GET interface on the object to insert, i.e., the add object, to access the value in the field of the add object including the key value. A database find operation is then called (at block 154) using the key value accessed from the add object. The database find operation comprises the logic described in FIG. 3. If (at block 156) the result of the find operation of FIG. 3 returns an index value 12a, b . . . n for an object 10a, b . . . n having a key value matching the key value of the add object, then the object store 6 already includes an object having the key value and a message is returned (at block 158) that the database 4 already includes an object for the key value. Additionally, the database server 4 may allow a duplicate object to be added if the policies defined for the object store 6 permit duplicate keys. If (at block 156) there is no object in the object store 6 including the key value of the add object, then the add object is inserted (at block 160) after the last object 10a, b . . . n in the object store. In Java vector implementations, the Java vector addElement( ) function is used to insert the add object at the end of the object store 6 Java vector. If the object store 6 vector is full, then the database server 20 would have to grow the vector and reallocate additional space for further objects to add to the object store 6.

The database server 20 then determines (at block 162) the index value 12n for the add object 10n inserted into the object store 6. In Java vector implementations, the database server 20 could use the Java vector lastIndexOf( ) function to determine the index value for the add object inserted at the end of the object store 6.

The database server 20 then generates (at block 164) a new B-Tree node for the add object, sets the index value field 50 to the index of the add object in the object store 6 determined at block 162, and sets the left 52 and right 54 children node index values to null, thereby indicating that the node 14n for the added object is a leaf node. The generated new node is then inserted (at block 166) into the B-Tree object and a determination is made (at block 168) of the index value of the new node in the B-Tree object 8. In Java vector implementations, the Java vector methods discussed above would be used to add the node to the B-Tree object 8 and determine the index value 16n for the added node 14n.

If (at block 170) the key value of the add object is less than the key value of the leaf node where the find operation of block 154 terminated, then the database server 20 updates (at block 172) the left child node index field 52 to the node index value of the added new node; otherwise, the right child node index field 54 is set (at block 174) to the index value of the added node. As shown in FIG. 3, the index value of the current leaf node where the find operation terminates may be returned at block 188. The database server 20 would use this leaf node index value 16a, b . . . n to access the leaf node 14a, b . . . n where the search terminated and modify the leaf node to make the add object node a child of that leaf node 14a, b . . . n. The database server 20 may also implement update or delete operations of the objects 10a, b . . . n in the object store 6. To delete or update an object 10a, b . . . n, the database client 22 requesting the update would provide the key value for the object 10a, b . . . n to delete or update. The database server 20 would then traverse the B-Tree implemented in the B-Tree object 8 to locate the object 10a, b . . . n in the object store 6 having the matching key value to update or delete. Additionally, the database client 22 may use the index value 12a, b . . . n of the object 10a, b . . . n in the object store 6 as a handle to directly access the object 10a, b . . . n to update or delete without traversing the B-Tree. Still further, after adding or deleting an object from the object store 6, the database server 20 may perform a rebalancing operation on the B-Tree object 8 to adjust the balancing of the nodes in order to optimize search performance.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the discussed implementations, the Java object oriented programming language was used to implement the object store and B-Tree object. However, the objects and database server may utilize object oriented programming languages other than Java, e.g., C, C++, Smalltalk, Fortran, etc. Still further, the objects and data server may be implemented with a non-Java object oriented programming language. Moreover, in alternative implementations, the object store and B-Tree object may be implemented in data structures other than a Java vector.

In discussed implementations, the objects in the object store 6 were instances of the same class. The object oriented database 4 may further include multiple object stores 6, where there is a separate B-Tree object 8 for each object store 6, such that each object store includes objects instantiated from a class that is different than the classes used to instantiate objects in the other object stores 6. In alternative implementations, the objects in one object store 6 may be instances of different classes. In such case, the database server 20 would have to keep track of the field in the objects instantiated from different classes including the key value. Objects of the same class would include the same key value field(s).

In discussed implementations, the objects in the object store comprised an object implemented using an object oriented computer language. In alternative implementations, the objects in the object store 10a, b . . . n may be in different formats, such as an Extensible Markup Language (XML) object, HyperText Transfer Protocol, or any other file format.

In discussed implementations, the database client is included in a client system that communicates with the database server over a network. In alternative implementations, the database client 22 and server 20 may be implemented on the same computing platform.

In the discussed implementations, the searchable index on the object store was implemented as a B-Tree. Alternative structures may be utilized to implement the searchable index other than the B-Tree structure, such as B+ Trees, ternary trees, etc.

The foregoing description of various implementation of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for indexing object oriented objects in an object oriented database, comprising:

providing an object data structure including a plurality of object oriented objects, wherein each object includes a key value, and wherein each object is associated with an object index;

providing a node data structure including nodes, wherein each node represents one object in the object store and includes one object index used to access the object represented by the node in the object store, and wherein the nodes in the node data structure are organized according to the key values in the objects represented by the nodes; and using the node data structure to access the objects in the object store.

2. The method of claim 1, wherein each node is associated with one node index used to access the node in the node data structure, wherein each node is further capable of including one or more node indexes to further nodes, further comprising:

receiving a search key;

accessing one node using the node index for the node;

using the object index in the accessed node to access the object in the object store;

accessing the key value in the accessed object; and performing an operation if the accessed key value matches the search key.

3. The method of claim 2, further comprising:

if the accessed key value does not match the search key and if the accessed node includes a node index to another node, then using the node index to access the further node and performing another iteration of the steps of using the object index in the further node to access one object in the object store, accessing the key value in the accessed object, and performing the operation if the accessed key value matches the search key.

4. The method of claim 2, wherein the nodes represent nodes in a tree data structure, wherein the further node accessed using the node index in one node comprises a child node of the node including the node index.

5. The method of claim 2, wherein each node is associated with a first node index and a second node index, wherein using the first and second node indexes to access the further node comprises:

using the first node index to access the further node if the search key is less than the accessed key value; and using the second node index to access the further node if the search key is greater than the accessed key value.

6. The method of claim 2, wherein a node that does not include a value indexing another node in one node index comprises a leaf node, wherein the operation performed comprises a request to add a received object to the object data structure, further comprising:
   if the accessed key value does not match the search key and if the accessed node comprises a leaf node, then performing:
      (i) adding the received object to the object data structure;
      (ii) associating one object index with the received object;
      (iii) generating a new node for the received object including the object index associated with the received object;
      (iv) generating one new node index to associate with the received object that is used to access the new node in the node data structure; and
      (iv) updating the leaf node to include the new node index to the new node.

7. The method of claim 6, wherein the leaf node includes a first node index and a second node index, wherein updating the leaf node to include the new node index further comprises:
   updating the first node index to include the new node index if the search key is less than the accessed key value; and
   updating the second node index to include the new node index if the search key is greater than the accessed key value.

8. The method of claim 2, wherein accessing the key value in the accessed object comprises:
   issuing a request to access one field in the accessed object including the key value.

9. The method of claim 8, wherein the field including the key value is embedded within one object embedded within the accessed object, wherein issuing the request comprises issuing the request against the accessed object, wherein the accessed object issues the request against the embedded object for the field including the key value.

10. The method of claim 2, wherein the operation comprises a request for one object in the object data structure having the key value matching the search key, and wherein performing the operation comprises:
   returning the accessed object if the key value in the accessed object matches the search key.

11. The method of claim 2, wherein one node in the node data structure comprises a root node, wherein a root node index used to access the root node in the node data structure is maintained in an additional data structure, wherein the first node accessed comprises the root node, and further comprising accessing the root node index from the additional data structure when accessing a first node in the node data structure.

12. The method of claim 1, wherein the object data structure and node data structure comprise an array data structure, and wherein the object and node indexes are used to access the associated object and node, respectively, in the array.

13. The method of claim 12, wherein the array data structure comprises a one dimensional array that can expand or contract automatically to accommodate adding and removing elements therefrom.

14. The method of claim 13, wherein the array data structure comprises a Java vector.

15. The method of claim 1, wherein the objects in the object data structure are instantiated from the same class and include the same field having the key value.

16. The method of claim 1, wherein each object includes multiple key value fields used to organize the nodes in the node data structure.

17. The method of claim 1, wherein the objects in the object data structure are instantiated from different classes.

18. The method of claim 1, wherein the operation is a member of a set of database operations comprising adding a new object, searching for one object, updating one object, and deleting one object in the object data store.

19. The method of claim 1, wherein there are multiple object data structures, wherein there is one node data structure for each object data structure, and wherein each object data structure includes objects instantiated from a same class, and wherein the classes used to instantiate the objects in different object data structures comprise different classes.

20. A system for indexing object oriented objects in an object oriented database, comprising:
   means for providing an object data structure including a plurality of object oriented objects, wherein each object includes a key value, and wherein each object is associated with an object index;
   means for providing a node data structure including nodes, wherein each node represents one object in the object store and includes one object index used to access the object represented by the node in the object store, and wherein the nodes in the node data structure are organized according to the key values in the objects represented by the nodes; and
   means for using the node data structure to access the objects in the object store.

21. The system of claim 20, wherein each node is associated with one node index used to access the node in the node data structure, wherein each node is further capable of including one or more node indexes to further nodes, further comprising:
   means for receiving a search key;
   means for accessing one node using the node index for the node;
   means for using the object index in the accessed node to access the object in the object store;
   means for accessing the key value in the accessed object; and
   means for performing an operation if the accessed key value matches the search key.

22. The system of claim 21, further comprising:
   means for using, if the accessed key value does not match the search key and if the accessed node includes a node index to another node, the node index to access the further node and performing another iteration of the steps of using the object index in the further node to access one object in the object store, accessing the key value in the accessed object, and performing the operation if the accessed key value matches the search key.

23. The system of claim 21, wherein the nodes represent nodes in a tree data structure, wherein the further node accessed using the node index in one node comprises a child node of the node including the node index.

24. The system of claim 21, wherein each node is associated with a first node index and a second node index, wherein the means for using the first and second node indexes to access the further node performs:
   using the first node index to access the further node if the search key is less than the accessed key value; and using the second node index to access the further node if the search key is greater than the accessed key value.

25. The system of claim 21, wherein a node that does not include a value indexing another node in one node index comprises a leaf node, wherein the operation performed comprises a request to add a received object to the object data structure;

means for performing, if the accessed key value does not match the search key and if the accessed node comprises a leaf node:
(i) adding the received object to the object data structure;
(ii) associating one object index with the received object;
(iii) generating a new node for the received object including the object index associated with the received object;
(iv) generating one new node index to associate with the received object that is used to access the new node in the node data structure; and
(iv) updating the leaf node to include the new node index to the new node.

26. The system of claim 25, wherein the leaf node includes a first node index and a second node index, wherein the means for updating the leaf node to include the new node index further performs:

updating the first node index to include the new node index if the search key is less than the accessed key value; and updating the second node index to include the new node index if the search key is greater than the accessed key value.

27. The system of claim 21, wherein the means for accessing the key value in the accessed object further performs:

issuing a request to access one field in the accessed object including the key value.

28. The system of claim 27, wherein the field including the key value is embedded within one object embedded within the accessed object, wherein the means for issuing the request issues the request against the accessed object, wherein the accessed object issues the request against the embedded object for the field including the key value.

29. The system of claim 21, wherein the operation comprises a request for one object in the object data structure having the key value matching the search key, and wherein the means for performing the operation performs:

returning the accessed object if the key value in the accessed object matches the search key.

30. The system of claim 21, wherein one node in the node data structure comprises a root node, wherein a root node index used to access the root node in the node data structure is maintained in an additional data structure, wherein the first node accessed comprises the root node, and further comprising accessing the root node index from the additional data structure when accessing a first node in the node data structure.

31. The system of claim 20, wherein the object data structure and node data structure comprise an array data structure, and wherein the object and node indexes are used to access the associated object and node, respectively, in the array.

32. The system of claim 21, wherein the array data structure comprises a one dimensional array that can expand or contract automatically to accommodate adding and removing elements therefrom.

33. The system of claim 21, wherein the array data structure comprises a Java vector.

34. The system of claim 20, wherein the objects in the object data structure are instantiated from the same class and include the same field having the key value.

35. The system of claim 20, wherein each object includes multiple key value fields used to organize the nodes in the node data structure.

36. The system of claim 20, wherein the objects in the object data structure are instantiated from different classes.

37. The system of claim 20, wherein the operation is a member of a set of database operations comprising adding a new object, searching for one object, updating one object, and deleting one object in the object data store.

38. The system of claim 20, wherein there are multiple object data structures, wherein there is one node data structure for each object data structure, and wherein each object data structure includes objects instantiated from a same class, and wherein the classes used to instantiate the objects in different object data structures comprise different classes.

39. An article of manufacture for indexing object oriented objects in an object oriented database by:

providing an object data structure including a plurality of object oriented objects, wherein each object includes a key value, and wherein each object is associated with an object index;

providing a node data structure including nodes, wherein each node represents one object in the object store and includes one object index used to access the object represented by the node in the object store, and wherein the nodes in the node data structure are organized according to the key values in the objects represented by the nodes; and using the node data structure to access the objects in the object store.

40. The article of manufacture of claim 39, wherein each node is associated with one node index used to access the node in the node data structure, wherein each node is further capable of including one or more node indexes to further nodes, further comprising:

receiving a search key;
accessing one node using the node index for the node;
using the object index in the accessed node to access the object in the object store;
accessing the key value in the accessed object; and
performing an operation if the accessed key value matches the search key.

41. The article of manufacture of claim 40, further comprising:

if the accessed key value does not match the search key and if the accessed node includes a node index to another node, then using the node index to access the further node and performing another iteration of the steps of using the object index in the further node to access one object in the object store, accessing the key value in the accessed object, and performing the operation if the accessed key value matches the search key.

42. The article of manufacture of claim 40, wherein the nodes represent nodes in a tree data structure, wherein the further node accessed using the node index in one node comprises a child node of the node including the node index.

43. The article of manufacture of claim 40, wherein each node is associated with a first node index and a second node index, wherein using the first and second node indexes to access the further node comprises:

using the first node index to access the further node if the search key is less than the accessed key value; and using the second node index to access the further node if the search key is greater than the accessed key value.

44. The article of manufacture of claim 40, wherein a node that does not include a value indexing another node in one node index comprises a leaf node, wherein the operation performed comprises a request to add a received object to the object data structure, further comprising:
   if the accessed key value does not match the search key and if the accessed node comprises a leaf node, then performing:
      (i) adding the received object to the object data structure;
      (ii) associating one object index with the received object;
      (iii) generating a new node for the received object including the object index associated with the received object;
      (iv) generating one new node index to associate with the received object that is used to access the new node in the node data structure; and
      (iv) updating the leaf node to include the new node index to the new node.

45. The article of manufacture of claim 40, wherein the leaf node includes a first node index and a second node index, wherein updating the leaf node to include the new node index further comprises:
   updating the first node index to include the new node index if the search key is less than the accessed key value; and
   updating the second node index to include the new node index if the search key is greater than the accessed key value.

46. The article of manufacture of claim 40, wherein accessing the key value in the accessed object comprises:
   issuing a request to access one field in the accessed object including the key value.

47. The article of manufacture of claim 46, wherein the field including the key value is embedded within one object embedded within the accessed object, wherein issuing the request comprises issuing the request against the accessed object, wherein the accessed object issues the request against the embedded object for the field including the key value.

48. The article of manufacture of claim 40, wherein the operation comprises a request for one object in the object data structure having the key value matching the search key, and wherein performing the operation comprises:
   returning the accessed object if the key value in the accessed object matches the search key.

49. The article of manufacture of claim 40, wherein one node in the node data structure comprises a root node, wherein a root node index used to access the root node in the node data structure is maintained in an additional data structure, wherein the first node accessed comprises the root node, and further comprising accessing the root node index from the additional data structure when accessing a first node in the node data structure.

50. The article of manufacture of claim 39, wherein the object data structure and node data structure comprise an array data structure, and wherein the object and node indexes are used to access the associated object and node, respectively, in the array.

51. The article of manufacture of claim 50, wherein the array data structure comprises a one dimensional array that can expand or contract automatically to accommodate adding and removing elements therefrom.

52. The article of manufacture of claim 51, wherein the array data structure comprises a Java vector.

53. The article of manufacture of claim 39, wherein the objects in the object data structure are instantiated from the same class and include the same field having the key value.

54. The article of manufacture of claim 39, wherein each object includes multiple key value fields used to organize the nodes in the node data structure.

55. The article of manufacture of claim 39, wherein the objects in the object data structure are instantiated from different classes.

56. The article of manufacture of claim 39, wherein the operation is a member of a set of database operations comprising adding a new object, searching for one object, updating one object, and deleting one object in the object data store.

57. The article of manufacture of claim 39, wherein there are multiple object data structures, wherein there is one node data structure for each object data structure, and wherein each object data structure includes objects instantiated from a same class, and wherein the classes used to instantiate the objects in different object data structures comprise different classes.

58. A computer readable medium including data structures for indexing object oriented objects in an object oriented database, comprising:
   an object data structure including a plurality of object oriented objects, wherein each object includes a key value, and wherein each object is associated with an object index; and
   a node data structure including nodes, wherein each node represents one object in the object store and includes one object index used to access the object represented by the node in the object store, and wherein the nodes in the node data structure are organized according to the key values in the objects represented by the nodes, wherein the node data structure is used to access the objects in the object store.

59. The computer readable medium of claim 58, wherein each node is associated with one node index used to access the node in the node data structure, wherein each node is further capable of including one or more node indexes to further nodes, wherein the node index for one node is used to access the node, wherein the object index in the accessed node is used to access the object in the object store, wherein the key value is accessed from the accessed object, and wherein an operation is performed if the accessed key value matches the search key.

60. The computer readable medium of claim 59, wherein if the accessed key value does not match the search key and if the accessed node includes a node index to another node, then the node index is used to access the further node and another iteration is performed of the steps of using the object index in the further node to access one object in the object store, accessing the key value in the accessed object, and performing the operation if the accessed key value matches the search key.

61. The computer readable medium of claim 59, wherein the nodes represent nodes in a tree data structure, wherein the further node accessed using the node index in one node comprises a child node of the node including the node index.

62. The computer readable medium of claim 59, wherein each node is associated with a first node index and a second node index, wherein the first and second node indexes are used to access the further node by using the first node index to access the further node if the search key is less than the accessed key value and using the second node index to access the further node if the search key is greater than the accessed key value.

63. The computer readable medium of claim 58, wherein the field including the key value is embedded within one object embedded within the accessed object, wherein accessing the key value in the accessed object comprises issuing a request against the accessed object, wherein the accessed object issues a request against the embedded object for the field including the key value.

64. The computer readable medium of claim 59, wherein the operation performed comprises a request for one object in the object data structure having the key value matching the search key, and wherein performing the operation comprises:

returning the accessed object if the key value in the accessed object matches the search key.

65. The computer readable medium of claim 59, further comprising:

a root node data structure including a root node index used to access a root node in the node data structure, and wherein the root node index is accessed from the additional data structure when accessing a first node in the node data structure.

66. The computer readable medium of claim 59, wherein the object data structure and node data structure comprise an array data structure, and wherein the object and node indexes are used to access the associated object and node, respectively, in the array.

67. The computer readable medium of claim 66, wherein the array data structure comprises a one dimensional array that can expand or contract automatically to accommodate adding and removing elements therefrom.

68. The computer readable medium of claim 67, wherein the array data structure comprises a Java vector.

69. The computer readable medium of claim 59, wherein the objects in the object data structure are instantiated from the same class and include the same field having the key value.

70. The computer readable medium of claim 59, wherein each object includes multiple key value fields used to organize the nodes in the node data structure.

71. The computer readable medium of claim 59, wherein the objects in the object data structure are instantiated from different classes.

72. The computer readable medium of claim 59, wherein the operation is a member of a set of database operations comprising adding a new object, searching for one object, updating one object, and deleting one object in the object data store.

73. The computer readable medium of claim 59, wherein there are multiple object data structures, wherein there is one node data structure for each object data structure, and wherein each object data structure includes objects instantiated from a same class, and wherein the classes used to instantiate the objects in different object data structures comprise different classes.

\* \* \* \* \*